(12) United States Patent
Kong et al.

(10) Patent No.: US 9,491,182 B2
(45) Date of Patent: Nov. 8, 2016

(54) METHODS AND SYSTEMS FOR SECURE INTERNET ACCESS AND SERVICES

(71) Applicant: TENCENT TECHNOLOGY (SHENZHEN) COMPANY LIMITED, Shenzhen (CN)

(72) Inventors: Deyong Kong, Shenzhen (CN); Meng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/603,849

(22) Filed: Jan. 23, 2015

(65) Prior Publication Data
US 2015/0135282 A1 May 14, 2015

Related U.S. Application Data

(63) Continuation of application No. PCT/CN2014/086795, filed on Aug. 6, 2014.

(30) Foreign Application Priority Data

Aug. 22, 2013 (CN) .......................... 2013 1 0370337

(51) Int. Cl.
 *G06F 7/04* (2006.01)
 *H04L 29/06* (2006.01)
(52) U.S. Cl.
 CPC ........... *H04L 63/105* (2013.01); *H04L 63/126* (2013.01)

(58) Field of Classification Search
 CPC ........................... G06F 21/6218; H04L 63/08
 USPC .............................................................. 726/4
 See application file for complete search history.

(56) References Cited

U.S. PATENT DOCUMENTS

2014/0137190 A1* 5/2014 Carey ................. H04L 63/1433
 726/3

FOREIGN PATENT DOCUMENTS

| CN | 101383828 A | 3/2009 |
|---|---|---|
| CN | 101931534 A | 12/2010 |
| CN | 101964779 A | 2/2011 |
| CN | 102510337 A | 6/2012 |

OTHER PUBLICATIONS

The World Intellectual Property Organization (WIPO) International Search Report for PCT/CN2014/083795 Nov. 4, 2014.

* cited by examiner

*Primary Examiner* — Anthony Brown
(74) *Attorney, Agent, or Firm* — Anova Law Group, PLLC

(57) ABSTRACT

A method and system for providing secure internet access and services are disclosed. The method includes receiving a request for services from a user terminal, the request including user terminal data; sending the user terminal data to a security server; and receiving a security level of the user terminal from the security server. The security server determines the security level of the user terminal based on historical user data related to the user terminal. The method further includes initiating a verification process based on the security level of the user terminal.

20 Claims, 12 Drawing Sheets

METHODS AND SYSTEMS FOR SECURE INTERNET ACCESS AND SERVICES

RELATED APPLICATIONS

This application is a continuation application of PCT Patent Application No. PCT/CN2014/083795, filed on Aug. 6, 2014, which is based upon and claims the benefit of priority from Chinese Patent Application No. 201310370337.7 filed on Aug. 22, 2013, the entire content of both of which is incorporated herein by reference.

FIELD OF THE TECHNOLOGY

The present disclosure relates to communication technologies and, more particularly, to methods and systems for providing secure internet access and services.

BACKGROUND

With the development of Internet technologies, the type and the quantity of Internet services are rapidly increasing. Internet servers provide services to a large number of users. To successfully deliver services to users, various servers and user terminals exchange a large amount of related data. Thus, network capacities have become valuable commodities. In certain situations, an internet server may be accessed or attacked by adversary users. Such security breaches waste network resources, cause interruptions in normal services, and impair the security of various inter services. Because security is an important aspect of computer technology dealing with networked applications, technical solutions are needed to solve and/or improve the issues associated with secure Internet access and services.

The disclosed method and system are directed to solve one or more problems set forth above and other problems.

BRIEF SUMMARY OF THE DISCLOSURE

Embodiments consistent with the present disclosure provide a method, system, mobile device, or a server for providing secure internet access and services.

One aspect of the present disclosure provides a method for providing secure internet access and services. The method includes receiving a request for services from a user terminal, the request including user terminal data; sending the user terminal data to a security server; receiving a security level of the user terminal from the security server; and initiating a verification process based on the security level of the user terminal.

Further, the method may include receiving verification data from the user terminal; and providing the requested services to the user terminal. The method may also include receiving verification data from the user terminal; and sending a message to the user terminal. The message may indicate that the user terminal has failed the verification process. The security server may determine the security level of the user terminal based on historical user data related to the user terminal.

The user terminal may have a high security level if the historical user data related to the user terminal does not indicate security risk. The method for providing secure internet access and services may include initiating a simple verification process based on a user identification and a password. The user terminal may have a low security level if the historical user data related to the user terminal indicates security risk. The method may further include initiating an enhanced verification process to check whether the user terminal belongs to an adversarial user.

Another aspect of the present disclosure provides a method for providing secure internet access and services. The method includes receiving a request for services from a user terminal, the request including user terminal data; sending the user terminal data to a security server; receiving user terminal data from a web server; and searching for historical user data records related to the user terminal. The method further includes determining a security level of the user terminal based on the historical user data records; sending the security level of the user terminal to the web server; and initiating a verification process based on the security level.

Further, the method may include receiving verification data from the user terminal; validating the verification data; and providing the requested services. The method may also include receiving verification data from the user terminal and updating the historical user data records.

Another aspect of the present disclosure provides a system for providing secure internet access and services. The system includes a web server configured to receive a request for services from a user terminal, the request including user terminal data; and a security server configured to receive the user terminal data from the web server. The security server is further configured to search for historical user data records related to the user terminal; determine a security level of the user terminal based on the historical user data records; and send the security level of the user terminal to the web server. The web server is further configured to initiate a verification process based on the security level.

Further, the web server may be configured to receive verification data from the user terminal, validate the verification data, and provide the requested services. The security server may be configured to update the historical user data records.

The system for providing secure internet access and services further includes a user terminal configured to send a request for services to the web server. The user terminal is further configured to receive a response from the web server, the response initiating a verification process. The user terminal may be further configured to display a verification window for a user to enter verification data; and to provide verification data to the web server.

Other aspects of the present disclosure can be understood by those skilled in the art in light of the description, the claims, and the drawings of the present disclosure.

BRIEF DESCRIPTION OF THE DRAWINGS

To illustrate embodiments of the invention, the following are a few drawings illustrating embodiments consistent with the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 17:
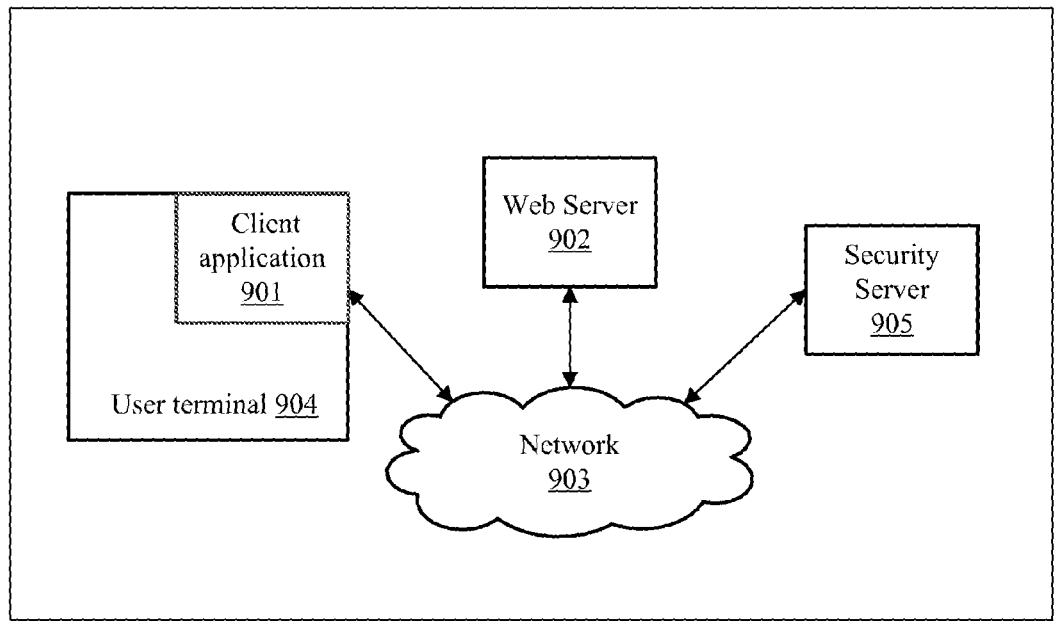
FIG. 17 illustrates an exemplary operating environment incorporating certain disclosed embodiments.

FIG. 17 illustrates an exemplary online computer environment 900 incorporating certain disclosed embodiments. As shown in FIG. 17, environment 900 may include a user terminal 904, a network 903, a web server 902, and a security server 905. The network 903 may include any appropriate type of communication network for providing network connections to the user terminal 904, the web server 902, and the security server 905. For example, network 903 may include the Internet, LAN (Local Area Network), or other types of computer networks or telecommunication networks, either wired or wireless.

A server, as used herein, may refer to one or more server computers configured to provide certain functionalities, such as functions of the instant messaging system. A server may also include one or more processors to execute computer programs in parallel. The web server 902 may include any appropriate server computers configured to provide certain web server functionalities, such as storing data related to delivering web pages to the user terminal 904. The security server 905 may include any appropriate server computers configured to provide certain security server functionalities, such as storing and processing data related to user credentials, security keys, etc. so that web server 902 may securely deliver web pages to the user terminal 904. Although only one web 902 and one security server 905 are shown, any number of servers can be included. The servers may operate in a cloud or non-cloud computing environment.

The user terminal 904 may include any appropriate type of mobile computing devices, such as iOS devices (e.g., an iPhone or iPad) or devices using any other computing platforms. User terminal 904 may include one or more client applications 901. The client application 901, as used herein, may include any appropriate software application, hardware application, or a combination thereof to achieve certain client functionalities. For example, client application 901 may be an instant messaging application such as WeChat. Any number of client applications 901 may be included on the user terminal 904 in the environment 900.

In one embodiment, the user terminal 904 may connect to a web server 902 to upload or download data for an instant messaging session. A user may use client application 901 to request access to or communicate with other users or user groups. The web server 902 may determine whether the user terminal 914 can access certain pages of the instant messaging session or access certain services. The web server 902 may also communication with security server 905 to check the user's credentials or verify user's access authorities before sending certain contents or services to the client application 901.

Figure 18:
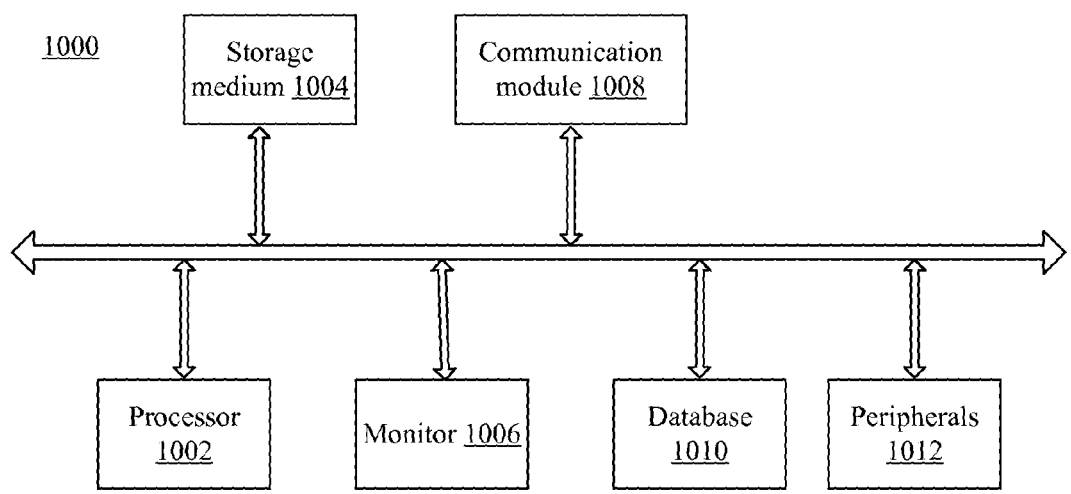
FIG. 18 illustrates a block diagram of an exemplary computer system consistent with the disclosed embodiments.

The user terminal 904 and servers 902 and 905 may be implemented on any appropriate computing platform. FIG. 18 illustrates a block diagram of an exemplary computer system 1000 capable of implementing user terminal 904 and servers 902 and 905.

As shown in FIG. 18, computer system 1000 may include a processor 1002, storage medium 1004, a monitor 1006, a communication module 1006, a database 1010, and peripherals 1012. Certain devices may be omitted and other devices may be included.

Processor 1002 may include any appropriate processor or processors. Further, processor 1002 can include multiple cores for multi-thread or parallel processing. Storage medium 1004 may include memory modules, such as Read-only memory (ROM), Random Access Memory (RAM), flash memory modules, and erasable and rewritable memory, and mass storages, such as CD-ROM, U-disk, and hard disk, etc. Storage medium 1004 may store computer programs for implementing various processes, when executed by processor 1002.

Further, peripherals 1012 may include I/O devices such as keyboard and mouse, and communication module 1006 may include network devices for establishing connections through the communication network. Database 1010 may include one or more databases for storing certain data and for performing certain operations on the stored data, such as database searching.

Figure 1:
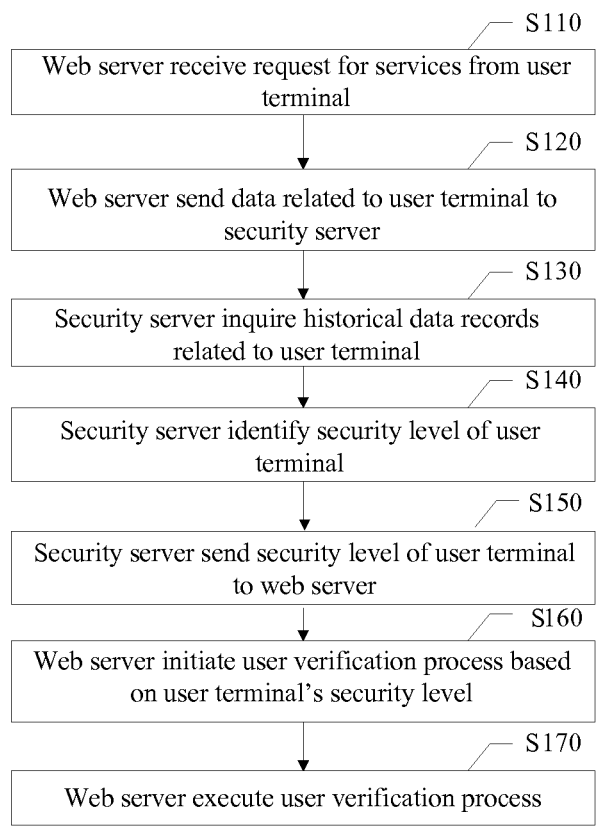
FIG. 1 is a flow chart of a method for secure network access and services consistent with various embodiments of the present disclosure.

In operation, the user terminal/client application 904/901 may submit or retrieve data from web server 902 to access certain contents in an instant messaging system. FIG. 1 shows a flow chart of a method for providing secure internet access and services. The method shown in FIG. 1 includes steps S110-S170.

In step S110, a web server may receive a request to visit a webpage or a request for services from a user terminal. A user terminal may be a computer, a smartphone, a tablet computer, or any other computing device that can access the internet and internet related services. The request for services may include data related to the user terminal. The data related to the user terminal may include a user account, user terminal identification, etc. In step S120, the web server may send the data related to the user terminal to a security server. The web server and the security server are connected through wired or wireless networks. In step S130, the security server may search for historical data records related to the user terminal. The security server may search for data records in a security database based on the data related to the user terminal. For example, the security server may identify past service requests, document transfers, or malicious access records related to the user terminal.

In step S140, the security server may identify the security level of the user terminal. The security server may analyze the user behavior based on the historical data records related to the user terminal, and determine the security level accordingly. If the user terminal has a clean security record (e.g., no malicious access or misuse) based on its historical data, then the security server may assign a high security level to the user terminal. If the user terminal has a poor security record (e.g., with malicious access or misuse) based on its historical data, then the security server may assign a low security level to the user terminal. A low security level user terminal may indicate that the user terminal belongs to a hacker or an adversarial user.

In step S150, the security server may send the security level of the user terminal to the web server. The security server may send the data and results of the security analysis to the web server. In step S160, the web server may initiate a user verification process based on the user terminal's security level. The web server may initiate a user verification process based on the data and results of the security analysis provided by the security server.

For a user terminal with a high security level, the web server may initiate a simple user verification process, for example, by only requiring the user account number and password. For a user terminal with a low security level, the web server may initiate an enhanced verification process. For example, in addition to the user account number and password, the web server may check the CATCHA code, SMS verification code, key card password, etc. related to the user account. For a user terminal with the lowest security level, the web server may reject the request for internet services.

In step S170, the web server may execute the user verification process. As described above, the web server may verify the user terminal based on its security level. The verification process may include the user terminal sending the requested user account number, password, CATCHA code, SMS verification code, key card password, etc. to the web server. The web server may receive the data from the user terminal and verify that the user terminal is secure. Once the web server completes the verification process, the web server may provide the user terminal with the requested services. If the user terminal fails the verification process, or that the user terminal has the lowest security level, the web server may reject the request for services from the user terminal (e.g., visit a webpage or access certain contents).

The web server thus prevents adversarial users from accessing web pages and/or web contents, reduces waste of network resources, and uses the network resources efficiently.

Embodiments consistent with the present disclosure use a security server and a web server to implement internet security functions. The security server may search for and analyze historical data related to a user terminal. The security server may assign security levels to the user terminal. The web server may implement different verification processes based on the security levels of user terminals. The web server may employ more strict verification processes for less secure user terminals. Embodiments consistent with the present disclosure prevent adversarial users from accessing web pages and/or web contents, reduce waste of network resources, use the network resources efficiently, and improve the security level of various internet services.

Figure 2:
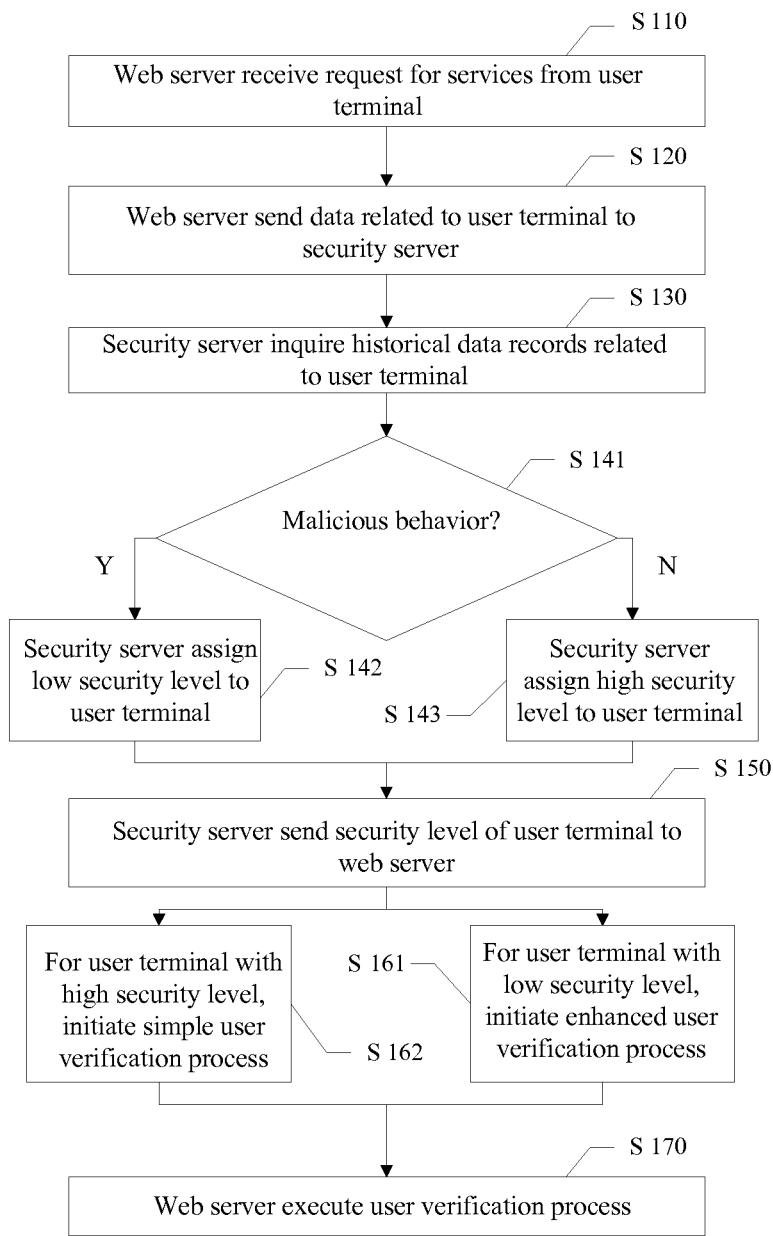
FIG. 2 is another flow chart of a method for secure network access and services consistent with various embodiments of the present disclosure.

FIG. 2 shows another flow chart of a method for providing secure internet accesses and services. The method shown in FIG. 2 includes steps S110-S170. FIG. 2 provides detailed descriptions of the steps described in relation to FIG. 1. Specifically, step S140 includes steps S141-143. Step S160 includes steps 161-162.

In step 141, the security server may determine whether the historical data records related to the user terminal include any malicious behavior. If so, the security server may execute step 142. If not, the security server may execute step 143. In step 142, the security server may assign a low security level to the user terminal. In step 143, the security server may assign a high security level to the user terminal.

In this example, malicious behavior may include illegal access to web pages or web contents, uploading virus or files with virus, hacking attempts, etc. If the user terminal has a clean security record (e.g., no malicious behavior or misuse) based on its historical data, then the security server may assign a high security level to the user terminal. If the user terminal has a poor security record (e.g., has malicious behavior or misuse) based on its historical data, then the security server may assign a low security level to the user terminal.

Further, for users with malicious behavior records, the security server may further analyze the extent of the behavior to determine more detailed security levels. For example, the security server may set a threshold value. If the occurrence of certain malicious behavior is less than the threshold, the security server may assign a medium-low security level to the user terminal. The web server may then initiate verification processes corresponding to the medium-low security level. If the occurrence of certain malicious behavior is more than the threshold, the security server may assign the lowest security level to the user terminal. The web server may then initiate verification processes corresponding to the lowest security level. The web server may deny the service request of the user terminal with the lowest security level to avoid potential issues that can be caused by such a user terminal.

In step S161, for a user terminal with a high security level, the web server may initiate a simple user verification process, for example, by only requiring a user account number and password. In step S162, for a user terminal with a low security level, the web server may initiate an enhanced verification process.

The web server may receive the results of the security analysis from the security server. The web server may initiate a user verification process based on the user terminal's security level. The web server may initiate a user verification process based on the data and results of the security analysis provided by the security server. For a user terminal with a high security level, the web server may initiate a simple user verification process, for example, by only requiring a user account number and password. Alternatively, a user terminal with a very high security level assigned to it may be provided with the requested services without further verification.

For a user terminal with a low security level, the web server may initiate an enhanced verification process. For example, in addition to the user account number and password, the web server may check the CATCHA code, SMS verification code, key card password, etc. related to the user account. Other than being an adversarial user terminal, the lower security level of the user terminal may be caused by network issues or user terminal hardware or software issues. Thus, if the user terminal passes the enhanced verification process, then the web server may determine that the user terminal is not adversarial. The web server may then provide the requested services. On the other hand, if the user terminal fails the enhanced verification process, then the web server may determine that the user terminal is adversarial. The web server may then deny the user terminal from accessing the requested services.

Embodiments consistent with the present disclosure use a security server and a web server to implement internet security functions. The security server may search for and analyze historical data related to a user terminal. The security server may assign security levels to the user terminal. The web server may implement different verification processes based on the security levels of user terminals. The web server may employ more strict verification processes for less secure user terminals. Embodiments consistent with the present disclosure prevent adversarial users from accessing web pages and/or web contents, reduce waste of network resources, use the network resources efficiently, and improve the security level of various internet services.

Figure 3:
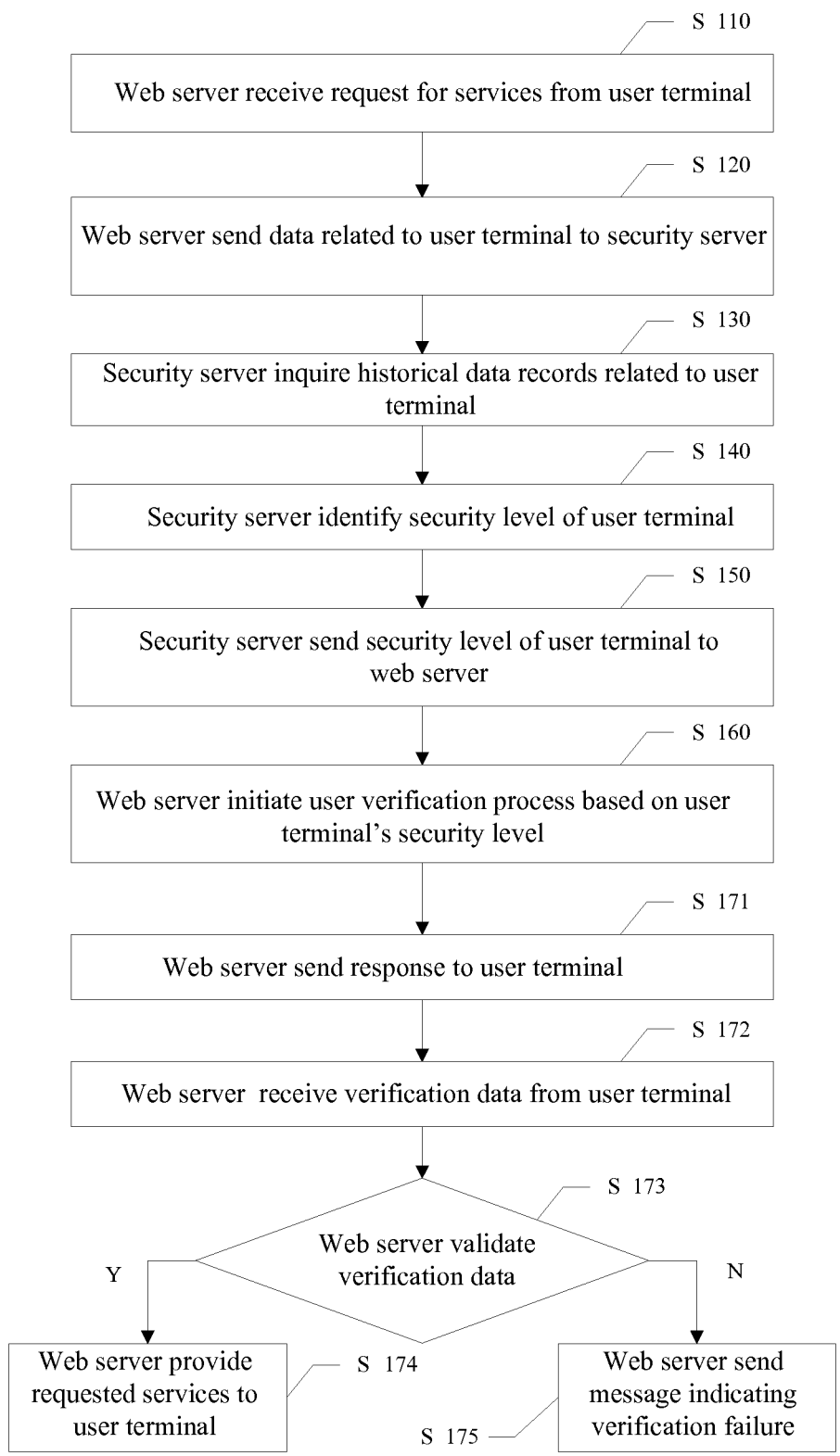
FIG. 3 is another flow chart of a method for secure network access and services consistent with various embodiments of the present disclosure.

FIG. 3 shows another flow chart of a method for providing secure internet accesses and services. The method shown in FIG. 3 includes steps S110-S175. FIG. 3 provides detailed descriptions of the steps described in relation to FIG. 1. Specifically, step S170 includes steps S171-175.

In step 171, the web server may send a response to the user terminal. The response may correspond to the security verification process. Once the web server initiates a verification process based on the security level of the user terminal, the web server may inform the user terminal of the verification request. For example, the web server may present a pop-up window for logging-in on the user terminal, display a CATCHA verification code, send a SMS verification message to a user's mobile phone, or present a pop-up window for entering a security code on the user terminal.

In step S172, the web server may receive the verification data from the user terminal. The user may enter verification code, password, etc. in response to the verification request from the web server. The web server may receive the verification data from the user terminal.

In step S173, the web server may validate the verification data. If the user terminal's verification data pass the validation, then the web server executes step S174. If not, the web server executes step S175. In step S174, the web server provides the requested services to the user terminal. In step S175, the web server sends a message indicating that the user terminal has failed the verification process to the user terminal.

If the web server determines that the verification data provided by the user terminal are valid, the web server may determine that the user terminal is secure, and provide the requested services to the user terminal. If the web server determines that the verification data provided by the user terminal are invalid, the web server may deny the user terminal's request for services. The web server may further display a message on the user terminal showing the failure of the verification process. The user may re-enter verification data. If the verification data have been found to be invalid multiple times, the web server may deny the user terminal's request for services. The web server may set a time limit after which the user may submit the verification data again.

Embodiments consistent with the present disclosure provide verification processes that correspond to the security levels of the user terminals. For user terminals with a high security level, embodiments of the present disclosure may simplify the verification process and improve the efficiency of the security check process. For user terminals with a low security level, embodiments of the present disclosure enhance the verification process to prevent any malicious attack to the network. Embodiments consistent with the present disclosure improve the security of internet services.

Figure 4:
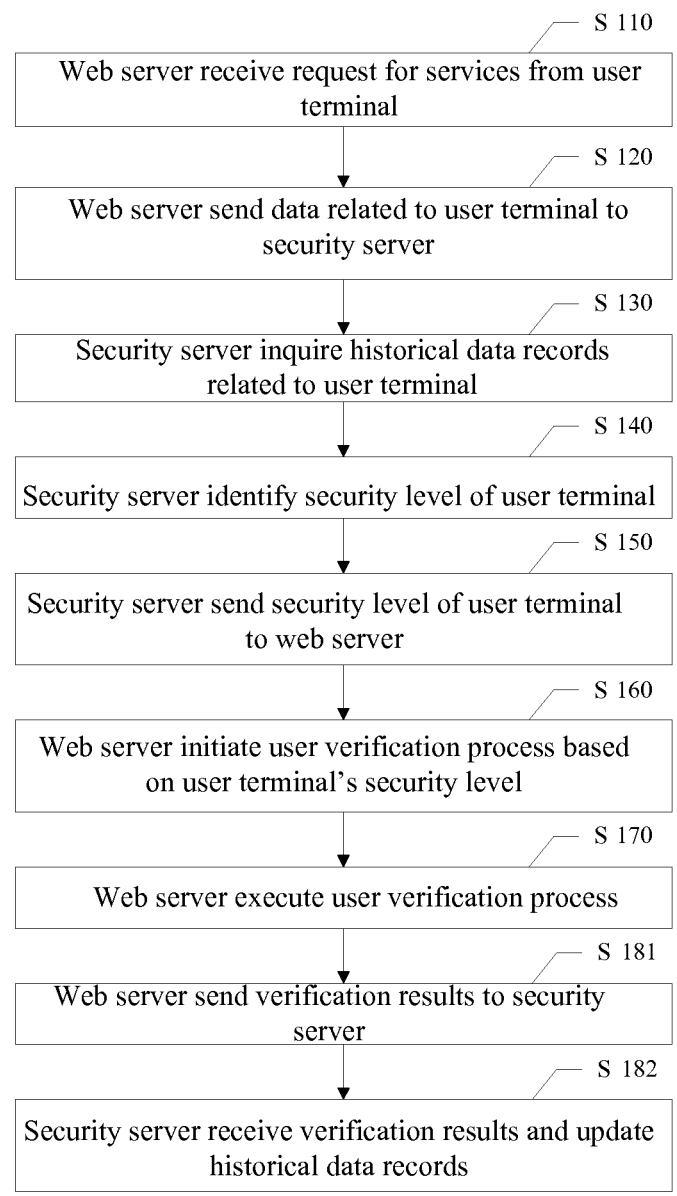
FIG. 4 is another flow chart of a method for secure network access and services consistent with various embodiments of the present disclosure.

FIG. 4 shows another flow chart of a method for providing secure internet accesses and services. The method shown in FIG. 4 includes steps S110-S182. FIG. 4 provides detailed descriptions of the steps described in relation to FIG. 1. Specifically, after step S170, the method includes steps S181-182.

In step 181, the web server may send the verification results to the security server. In step 182, the security server may receive the verification results and update historical data records related to the user terminal.

Embodiments consistent with the present disclosure store and update historical user data records. For new users, the security server may not have enough historical data records associated with the users. Certain user terminals may also have problematic historical data records because of network problems or user terminal software or hardware issues. For these users, it is important for the security server to update user data records and store the user data in a security database. The security server relies on having accurate historical user data records to analyze user or user terminal behavior. Keeping updated user data records thus improve the security analysis process implemented by the security server.

Figure 5:
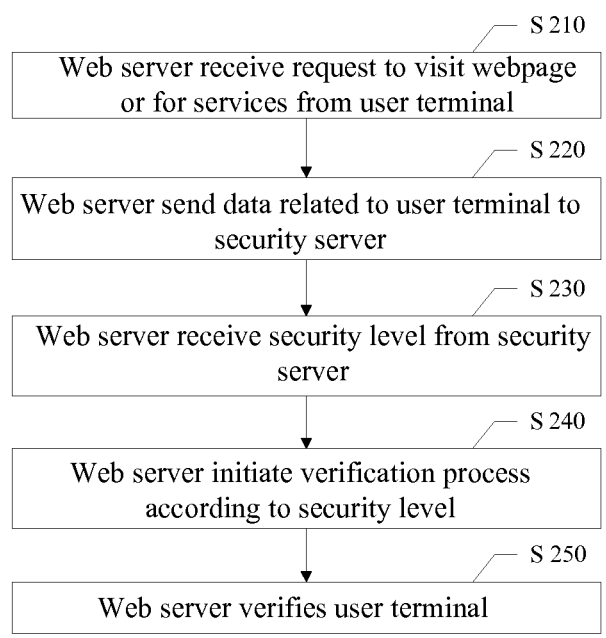
FIG. 5 is a flow chart of a method for internet service security verification consistent with various embodiments of the present disclosure.

FIG. 5 shows another flow chart of a method for providing secure internet access and services. The method shown in FIG. 5 includes steps S210-S250.

In step S210, the web server may receive a request for services from a user terminal. A user terminal may be a computer, a smartphone, a tablet computer, or any other computing device that can access the internet and internet related services. The request for services may include data related to the user terminal. The data related to the user terminal may include a user account number, user terminal identification, etc.

In step S220, the web server may send the data related to the user terminal to a security server. The web server and the security server are connected through wired or wireless networks. In step S230, the web server may receive the security level of the user terminal from the security server. The security level is determined by the security server based on security analysis of the user terminal data and historical data records associated with the user terminal.

In step S240, the web server may initiate a user verification process based on the user terminal's security level. The web server may initiate a user verification process based on the data and results of the security analysis provided by the security server.

For a user terminal with a high security level, the web server may initiate a simple user verification process, for example, by only requiring a user account number and password. For a user terminal with a low security level, the web server may initiate an enhanced verification process. For example, in addition to the user account number and password, the web server may check the CATCHA verification code, SMS verification code, key card password, etc. related to the user account. For a user terminal with the lowest security level, the web server may reject the request to visit the webpage.

In step S250, the web server may execute the user verification process. As described above, the web server may verify the user terminal based on its security level. The verification process may include the user terminal sending the requested user account number, password, CATCHA verification code, SMS verification code, key card password, etc. to the web server. The web server may receive the data from the user terminal and verify that the user terminal is secure. Once the web server completes the verification process, the web server may provide the user terminal with the requested services. If the user terminal fails the verification process, or that the user terminal has the lowest security level, the web server may reject the request for services from the user terminal (e.g., visit a webpage or access certain contents). The web server thus prevents adversarial users from accessing web pages and/or web contents, reduces waste of network resources, and uses the network resources efficiently.

Embodiments consistent with the present disclosure use a security server and a web server to implement internet security functions. The security server may search for and analyze historical data related to a user terminal. The security server may assign security levels to the user terminal. The web server may implement different verification processes based on the security levels of user terminals. The web server may employ more strict verification processes for less secure user terminals. Embodiments consistent with the present disclosure prevent adversarial users from accessing web pages and/or web contents, reduce waste of network resources, use the network resources efficiently, and improve the security level of various internet services.

Figure 6:
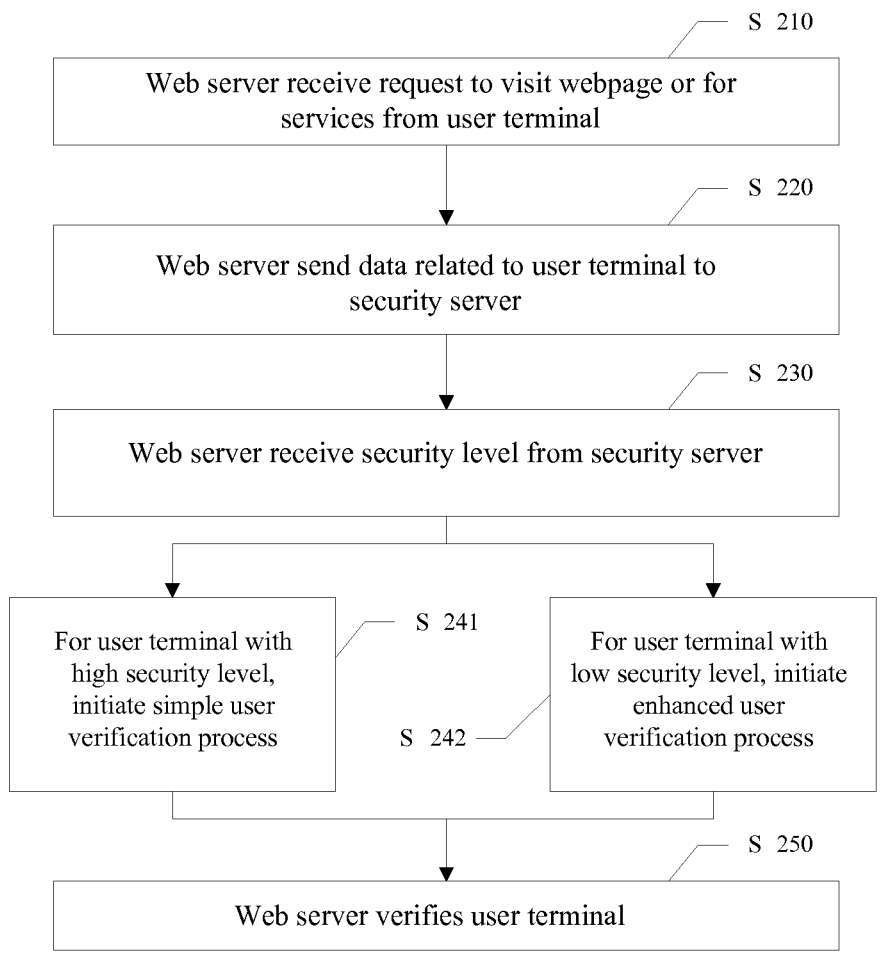
FIG. 6 is another flow chart of a method for internet service security verification consistent with various embodiments of the present disclosure.

FIG. 6 shows another flow chart of a method for providing secure internet access and services. The method shown in FIG. 6 includes steps S210-S250. FIG. 6 provides detailed descriptions of the steps described in relation to FIG. 5. Specifically, step S240 includes steps S241-S242.

In step S241, for a user terminal with a high security level, the web server may initiate a simple user verification process, for example, by only requiring user account number and password. In step S242, for a user terminal with a low security level, the web server may initiate a more secure verification process.

For a user terminal with a low security level, the web server may initiate a more secure verification process. For example, in addition to the user account number and password, the web server may check the CATCHA code, SMS verification code, key card password, etc. related to the user account. Other than being an adversarial user terminal, the lower security level of the user terminal may be caused by network issues or user terminal hardware or software issues. Thus, if the user terminal passes the enhanced verification process, then the web server may determine that the user terminal is not adversarial. The web server may then provide the requested services. On the other hand, if the user terminal fails the enhanced verification process, then the web server may determine that the user terminal is adversarial. The web server may then deny the user terminal from accessing the requested services.

Embodiments consistent with the present disclosure use a security server and a web server to implement internet security functions. The security server may search for and analyze historical data related to a user terminal. The security server may assign security levels to the user terminal. The web server may implement different verification processes based on the security levels of user terminals. The web server may employ more strict verification processes for less secure user terminals. Embodiments consistent with the present disclosure prevent adversarial users from accessing web pages and/or web contents, reduce waste of network resources, use the network resources efficiently, and improve the security level of various internet services.

Figure 7:
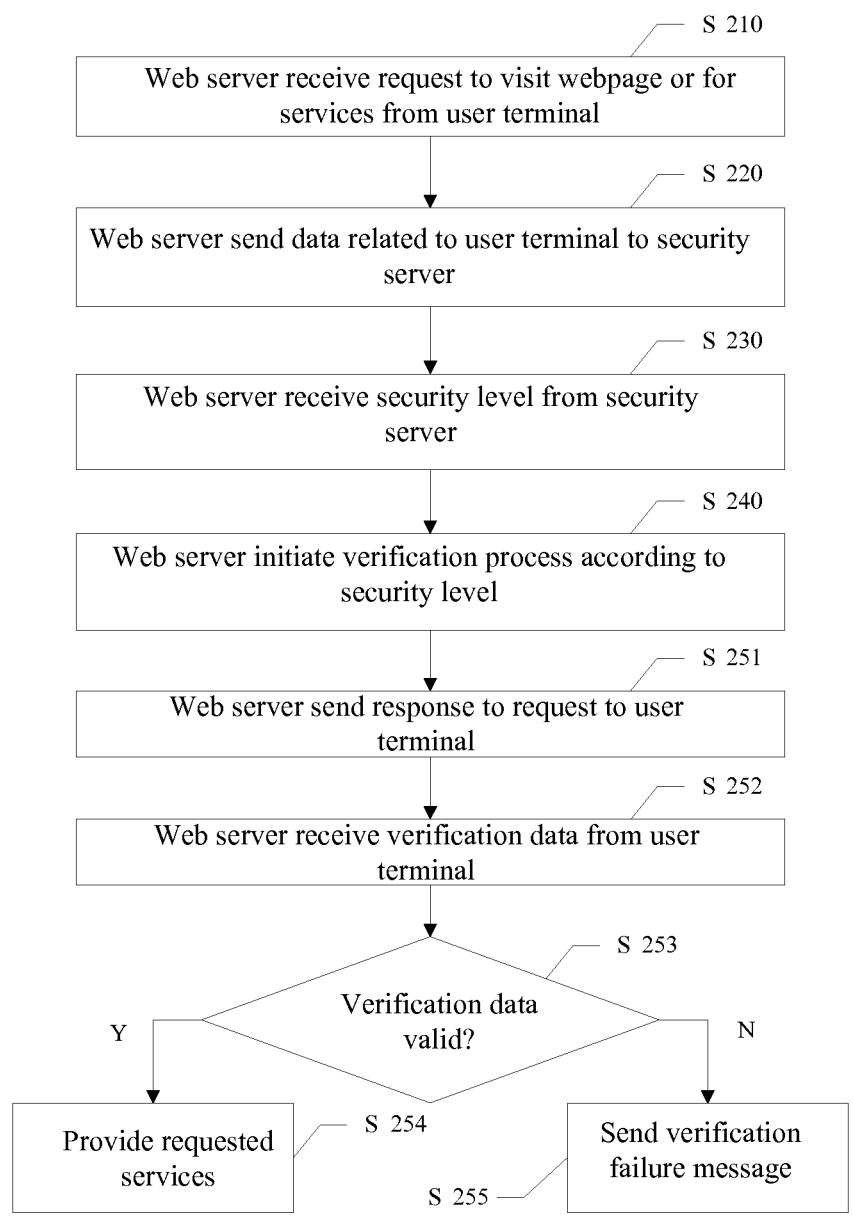
FIG. 7 is another flow chart of a method for internet service security verification consistent with various embodiments of the present disclosure.

FIG. 7 shows another flow chart of a method for providing secure internet access and services. The method shown in FIG. 7 includes steps S210-S255. FIG. 7 provides detailed descriptions of the steps described in relation to FIG. 5. Specifically, step S250 includes steps S251-S255.

In step 251, the web server may send a response to the user terminal. The response may correspond to the security verification process. Once the web server initiates a verification process based on the security level of the user terminal, the web server may inform the user terminal of the verification request. For example, the web server may present a pop-up window for logging-in on the user terminal, display a CATCHA verification code, send a SMS verification message to a user's mobile phone, or present a pop-up window for entering a security code on the user terminal.

In step S252, the web server may receive the verification data from the user terminal. The user may enter verification code, password, etc. in response to the verification request from the web server. The web server may receive the verification data from the user terminal.

In step S253, the web server may validate the verification data. If the user terminal's verification data pass the validation, then the web server executes step S254. If not, the web server executes step S255. In step S254, the web server provides the requested services to the user terminal. In step S255, the web server sends a message indicating that the user terminal has failed the verification process to the user terminal.

If the web server determines that the verification data provided by the user terminal are valid, the web server may determine that the user terminal is secure, and provide the requested services to the user terminal. If the web server determines that the verification data provided by the user terminal are invalid, the web server may deny the user terminal's request for services. The web server may further display a message on the user terminal showing the failure of the verification process. The user may re-enter verification data. If the verification data have been found to be invalid multiple times, the web server may deny the user terminal's request for services. The web server may set a time limit after which the user may submit the verification data again.

Embodiments consistent with the present disclosure provide a verification process that corresponds to the security level of the user terminal. For user terminals with a high security level, embodiments of the present disclosure may simplify the verification process and improve the efficiency of the security check process. For user terminals with a low security level, embodiments of the present disclosure enhance the verification process to prevent any malicious attack to the network. Embodiments consistent with the present disclosure improve the security of internet services.

Figure 8:
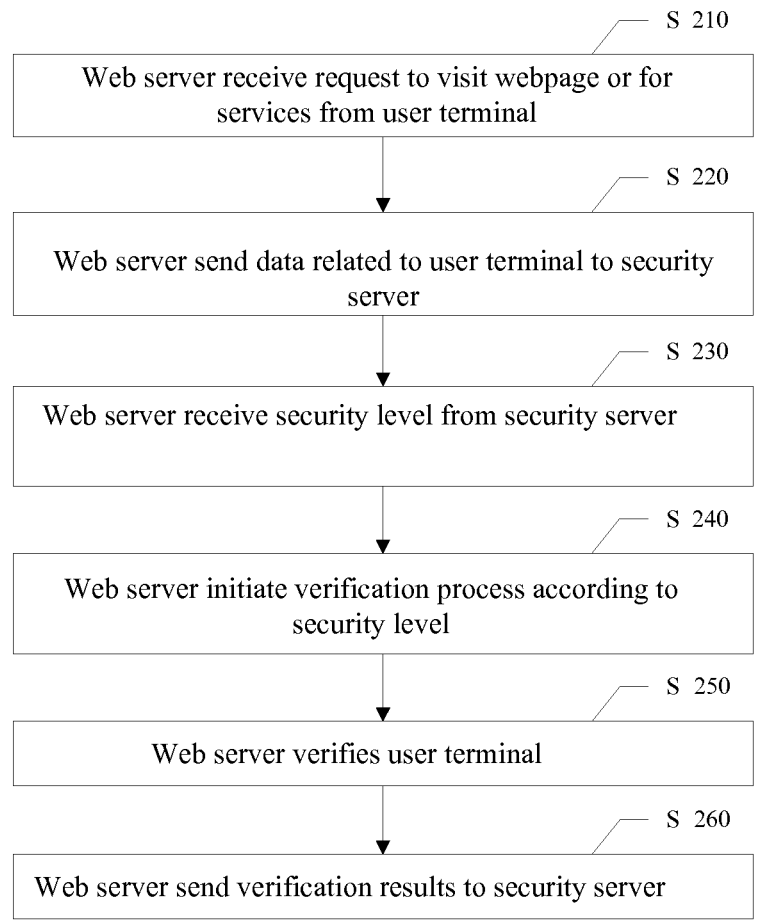
FIG. 8 is another flow chart of a method for internet service security verification consistent with various embodiments of the present disclosure.

FIG. 8 shows another flow chart of a method for providing secure internet access and services. The method shown in FIG. 8 includes steps S210-S260. FIG. 8 provides detailed descriptions of the steps described in relation to FIG. 5. Specifically, after step S250, the method includes step S260.

In step 260, the web server may send the verification results to the security server. The security server may receive the verification results and update historical data records related to the user terminal.

Embodiments consistent with the present disclosure store and update historical user data records. For new users, the security server may not have enough historical data records associated with the users. Certain user terminals may also have problematic historical data records because of network problems or user terminal software or hardware issues. For these users, it is important for the security server to update user data records and store the user data in a security database. The security server relies on having accurate historical user data records to analyze user or user terminal behavior. Keeping updated user data records thus improve the security analysis process implemented by the security server.

Figure 9:
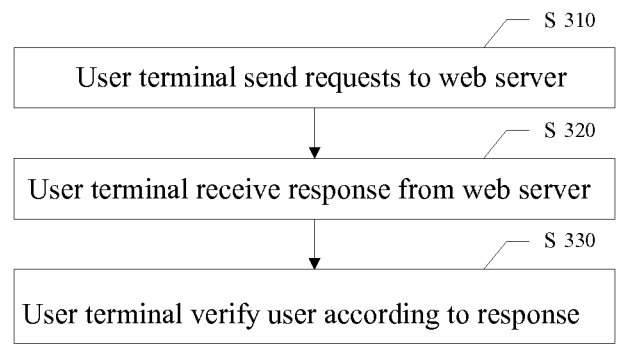
FIG. 9 is another flow chart of a method for secure network access and services consistent with various embodiments of the present disclosure.

FIG. 9 shows another flow chart of a method for providing secure internet access and services. The method shown in FIG. 9 includes steps S310-S330. In step S310, a user terminal may send a request for services to a web server. A user terminal may be a computer, a smartphone, a tablet computer, or any other computing device that can access the internet and internet related services. The request for visit may include data related to the user terminal. The data related to the user terminal may include a user account, user terminal identification, etc.

The web server may receive a security level of the user terminal. The security level is determined based on user terminal data. The web server may initiate a user verification process based on the user terminal's security level. The web server may initiate a user verification process based on the data and results of the security analysis provided by the security server.

For a user terminal with a high security level, the web server may initiate a simple user verification process, for example, by only requiring the user account number and password. For a user terminal with a low security level, the web server may initiate a more secure verification process. For example, in addition to the user account number and password, the web server may check the CATCHA code, SMS verification code, key card password, etc. related to the user account.

For user terminals with a high security level, embodiments of the present disclosure may simplify the verification process and improve the efficiency of the security check process. For user terminals with a low security level, embodiments of the present disclosure enhance the verification process to prevent any malicious attack to the network. Embodiments consistent with the present disclosure improve the security of internet services.

In step S320, the user terminal may receive the response to its request for services from the web server, requiring the user to complete the verification process. In step S330, the user terminal may provide verification data requested by the web server.

By sending the request to complete the verification process, the web server initiates the verification process. The verification process corresponds to the security level of the user terminal. The user terminal starts and completes the verification process by providing the required verification data to the web server.

Embodiments consistent with the present disclosure provide a verification process that corresponds to the security level of the user terminal. For user terminals with a high security level, embodiments of the present disclosure may simplify the verification process and improve the efficiency of the security check process. For user terminals with a low security level, embodiments of the present disclosure enhance the verification process to prevent any malicious attack to the network. Embodiments consistent with the present disclosure improve the security of internet services.

Figure 10:
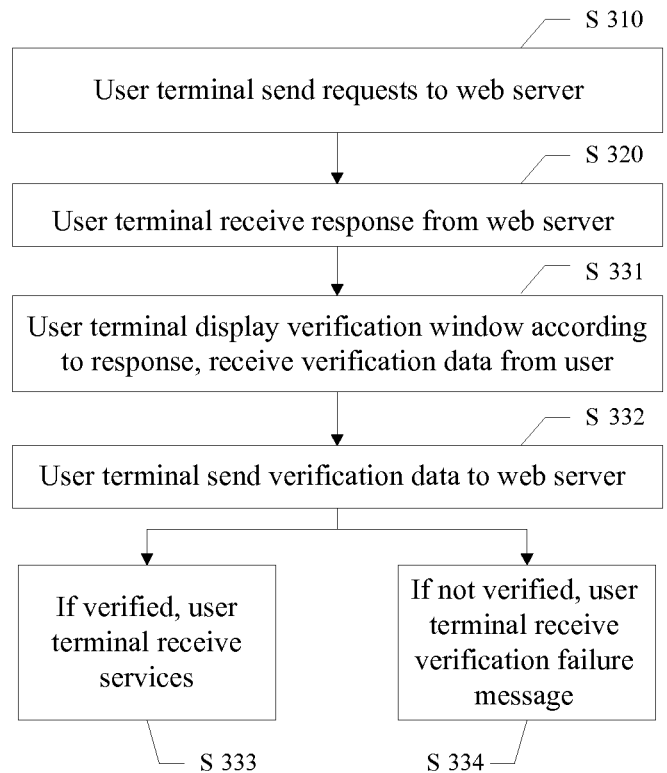
FIG. 10 is another flow chart of a method for secure network access and services consistent with various embodiments of the present disclosure.

FIG. 10 shows another flow chart of a method for providing secure internet access and services. The method shown in FIG. 10 includes steps S310-334. FIG. 10 provides detailed descriptions of the steps described in relation to FIG. 9. Specifically, step S330 further includes steps S331-334.

In step S331, the user terminal displays a verification window based on the request to complete verification received from the web server. The user terminal may receive data from the user through the verification window.

The user terminal may display a verification window corresponding to the specific verification process. For a simple user verification process, for example, the user terminal may display a window only requiring the user account number and password to be entered. For a more secure verification process, in addition to the user account number and password, the user terminal may display a window prompting the user to enter the CATCHA code, SMS verification code, key card password, etc. related to the user account. The user terminal thus improves the security of the verification process and prevents misuse or malicious access to the web server.

In step S332, the user terminal may send verification data to the web server. Based on the prompts in the verification windows, the user may enter requested password or other verification code. The user terminal may send the verification data to the web server. The web server may complete the verification process.

In step S333, if the verification process is successful, the user terminal receives the requested internet services or web contents from the web server. Based on the provided verification data, the web server may determine that the user terminal is a secure user, and provide the requested internet services/contents. The user terminal may receive the internet services/contents. The user may access the received internet services/contents through the user terminal.

In step S334, if the verification process is unsuccessful, the user terminal may receive a message indicating a verification failure. The user may re-enter verification data. If the verification data have failed multiple times, the web server may deny the user terminal's request for services. The web server may set a time after which the user may submit the verification data again.

Embodiments consistent with the present disclosure provide a verification process that corresponds to the security level of the user terminal. For user terminals with a high security level, embodiments of the present disclosure may simplify the verification process and improve the efficiency of the security check process. For user terminals with a low security level, embodiments of the present disclosure enhance the verification process to prevent any malicious attack to the network. Embodiments consistent with the present disclosure improve the security of internet services.

Figure 11:
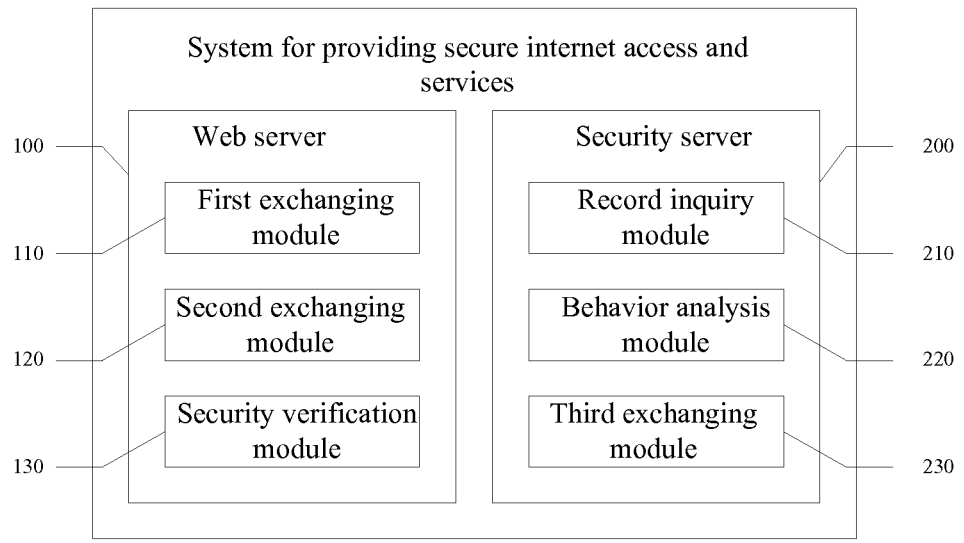
FIG. 11 is a block diagram of an exemplary system for secure network access and services consistent with various embodiments of the present disclosure.

FIG. 11 shows a block diagram of an exemplary system for providing secure internet access and services. The system includes a web server 100 and a security server 200. The web server 100 includes a first exchanging module 110 which receives requests from user terminals; a second exchanging module 120, which sends user terminal data to the security server 200; and a security verification module 130, which receives user terminal security level from the web server and initiates a verification process to authenticate the user terminal. The security server 200 includes a record inquiry module 210, which inquires historical user data records associated with a user terminal; a behavior analysis module 220, which determines the security level of a user terminal based on related historical user records; and a third exchanging module 230, which sends the user terminal security level to the user terminal.

A user terminal may be a computer, a smartphone, a tablet computer, or any other computing device that can access the internet and internet related services. The request for services may include data related to the user terminal. The data related to the user terminal may include a user account, user terminal identification, etc. The user terminal may send the user terminal data together with a request for internet services to web server 100.

The web server 100 may send the data related to the user terminal to the security server 200. The web server 100 and the security server 200 are connected through wired or wireless networks. The security server 200 may inquire historical data records related to the user terminal. The security server 200 may search for data records in a security database based on the data related to the user terminal. For example, the security server 200 may identify past service requests, document transfers, or malicious access records related to the user terminal.

The security server 200 may determine the security level of the user terminal. The security server 200 may analyze the user behavior based on the historical data records related to the user terminal, and determine the security level accordingly. If the user terminal has a clean security record (e.g., no malicious access or misuse) based on its historical data, then the security server may assign a high security level to the user terminal. If the user terminal has a poor security record (e.g., with malicious access or misuse) based on its historical data, then the security server may assign a low security level to the user terminal. A low security level user terminal may indicate that the user terminal belongs to a hacker or an adversarial user.

The security server 200 may send the security level of the user terminal to the web server 100. The security server 200 may send the data and results of the security analysis to the web server 100. The web server may 100 initiate a user verification process based on the user terminal's security level. The web server 100 may initiate a user verification process based on the data and results of the security analysis provided by the security server 200.

For a user terminal with a high security level, the web server 100 may initiate a simple user verification process, for example, by only requiring user account number and password. For a user terminal with a low security level, the web server 100 may initiate a more secure verification process. For example, in addition to the user account number and password, the web server 100 may check the CATCHA code, SMS verification code, key card password, etc. related to the user account. For a user terminal with the lowest security level, the web server 100 may reject the request to visit the webpage.

The web server 100 may execute the user verification process. As described above, the web server 100 may verify the user terminal based on its security level. The verification process may include the user terminal sending the requested user account number, password, CATCHA code, SMS verification code, key card password, etc. to the web server 100. The web server 100 may receive the data from the user terminal and verify that the user terminal is secure. Once the web server 100 completes the verification process, the web server may provide the user terminal with the requested services. If the user terminal fails the verification process, or that the user terminal has the lowest security level, the web server 100 may reject the request for services from the user terminal (e.g., visit a webpage or access certain contents). The web server 100 thus prevents adversarial users from accessing web pages and/or web contents, reduces waste of network resources, and uses the network resources efficiently.

Embodiments consistent with the present disclosure use a security server and a web server to implement internet security functions. The security server may search for and analyze historical data related to a user terminal. The security server may assign security levels to the user terminal. The web server may implement different verification processes based on the security levels of user terminals. The web server may employ more strict verification processes for less secure user terminals. Embodiments consistent with the present disclosure prevent adversarial users from accessing web pages and/or web contents, reduce waste of network resources, use the network resources efficiently, and improve the security level of various internet services.

The behavior analysis module 220 may determine the security level of the user terminal. The behavior analysis module 220 may determine whether the historical data records related to the user terminal include any malicious behavior. If so, the behavior analysis module 220 assigns a low security level to the user terminal. If not, the behavior analysis module 220 may assign a high security level to the user terminal.

In this example, malicious behavior may include illegal access to web page or web contents, uploading virus or files with virus, hacking attempts, etc. If the user terminal has a clean security record (e.g., no malicious behavior or misuse) based on its historical data, then the security server may assign a high security level to the user terminal. If the user terminal has a poor security record (e.g., has malicious behavior or misuse) based on its historical data, then the security server may assign a low security level to the user terminal.

Further, for users with malicious behavior records, the behavior analysis module 220 may further analyze the extent of the behavior to determine more detailed security levels. For example, the behavior analysis module 220 may set a threshold value. If the occurrences of certain malicious behavior are fewer than the threshold, the behavior analysis module 220 may assign a medium-low security level to the user terminal. The web server 100 may then initiate verification processes corresponding to the medium-low security level. If the occurrences of certain malicious behavior are more than the threshold, the behavior analysis module 220 may assign the lowest security level to the user terminal. The web server 100 may then initiate verification processes corresponding to the lowest security level. The web server 100 may deny the service request of the user terminal with the lowest security level to avoid potential issues that can be caused by such a user terminal.

For a user terminal with a high security level, the security verification module 130 may initiate a simple user verification process, for example, by only requiring the user account number and password. For a user terminal with a low security level, the security verification module 130 may initiate a more secure verification process.

For example, in addition to the user account number and password, the web server may check the CATCHA code, SMS verification code, key card password, etc. related to the user account. Other than being an adversarial user terminal, the lower security level of the user terminal may be caused by network issues or user terminal hardware or software issues. Thus, if the user terminal passes the enhanced verification process, then the web server may determine that the user terminal is not adversarial. The web server may then provide the requested services. On the other hand, if the user terminal fails the enhanced verification process, then the web server may determine that the user terminal is adversarial. The web server may then deny the user terminal from accessing the requested services.

Embodiments consistent with the present disclosure use a security server 200 and a web server 100 to implement internet security functions. The security server 200 may search for and analyze historical data related to a user terminal. The security server 200 may assign security levels to the user terminal. The web server 100 may implement different verification processes based on the security levels of user terminals. The web server 100 may employ more strict verification processes for less secure user terminals. Embodiments consistent with the present disclosure prevent adversarial users from accessing web pages and/or web contents, reduce waste of network resources, use the network resources efficiently, and improve the security level of various internet services.

Figure 12:
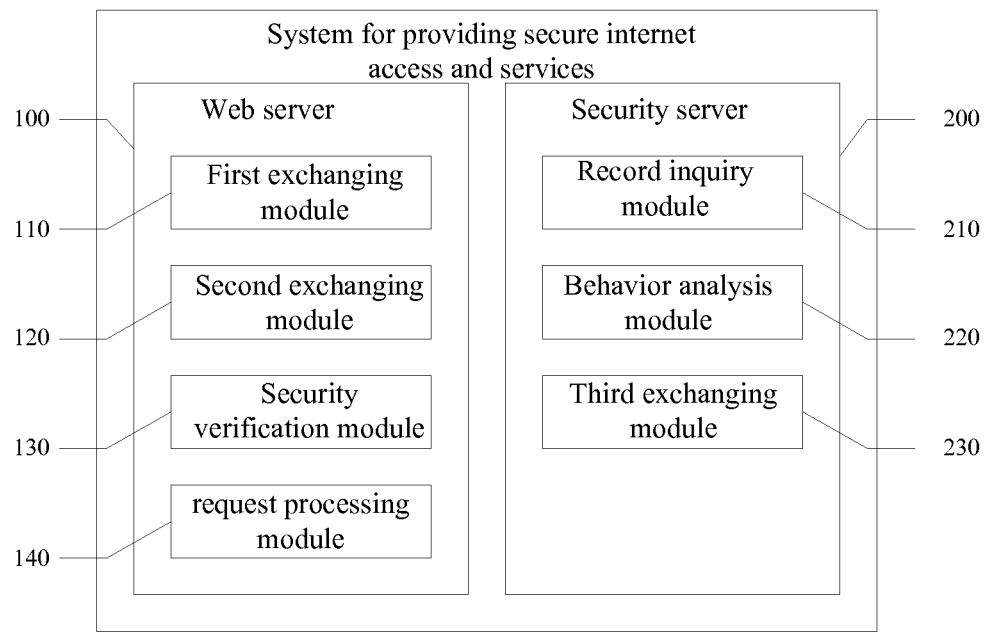
FIG. 12 is another block diagram of an exemplary system for secure network access and services consistent with various embodiments of the present disclosure.

FIG. 12 shows another block diagram of an exemplary system for providing secure internet access and services. FIG. 12 provides detailed descriptions of the system components described in relation to FIG. 11. Specifically, the web server 100 further includes a request processing module 140, which communicates with user terminals regarding service requests.

The first exchanging module 110 may send a request for verification to the user terminal. The first exchanging module 110 may receive verification data submitted by the user terminal. The security verification module 130 may further validate the verification data submitted by the user terminal.

If the user terminal's verification data pass the validation, then the request processing module 140 may provide the requested services to the user terminal. If not, the request processing module 140 may send a message indicating that the user terminal has failed the verification process to the user terminal.

To initiate the verification process, the web server 100 may present a pop-up window for log-in on the user terminal, display a CATCHA verification code, send a SMS verification message to a user's mobile phone, or present a pop-up window for entering a security code on the user terminal.

The web server 100 may receive the verification data from the user terminal. The user may enter verification code, password, etc. in response to the verification request from the web server. The web server may receive the verification data from the user terminal.

If the web server determines that the verification data provided by the user terminal are valid, the web server 100 may determine that the user terminal is secure, and provide the requested services to the user terminal. If the web server 100 determines that the verification data provided by the user terminal are invalid, the web server may deny the user terminal's request for services. The web server 100 may further display a message on the user terminal showing the failure of the verification process. The user may re-enter verification data. If the verification data have been found to be invalid multiple times, the web server may deny the user terminal's request for services. The web server may set a time after which the user may submit the verification data again.

Embodiments consistent with the present disclosure provide a verification process that corresponds to the security level of the user terminal. For user terminals with a high security level, embodiments of the present disclosure may simplify the verification process and improve the efficiency of the security check process. For user terminals with a low security level, embodiments of the present disclosure enhance the verification process to prevent any malicious attack to the network. Embodiments consistent with the present disclosure improve the security of internet services.

Figure 13:
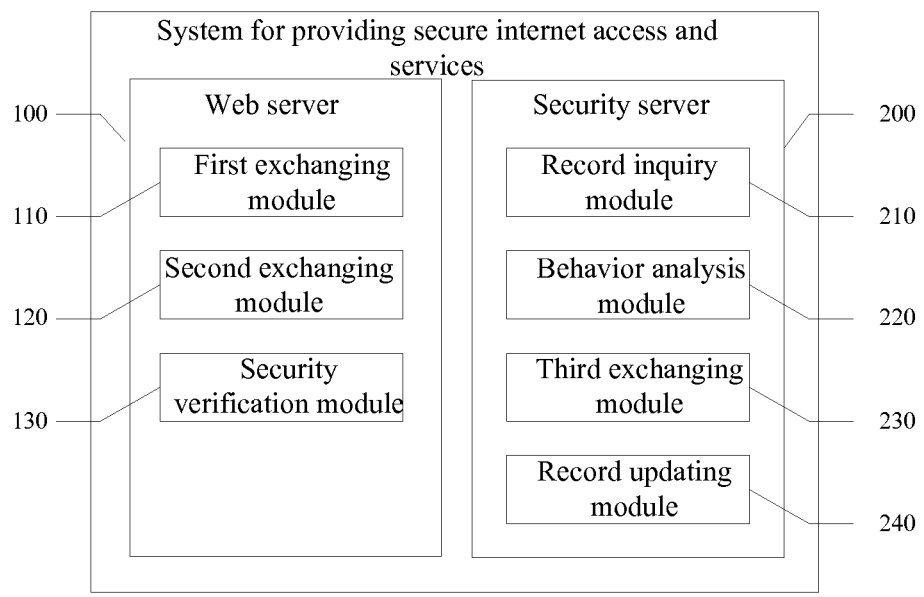
FIG. 13 is another block diagram of an exemplary system for secure network access and services consistent with various embodiments of the present disclosure.

FIG. 13 shows another block diagram of an exemplary system for providing secure internet access and services. FIG. 13 provides detailed descriptions of the system components described in relation to FIG. 11. Specifically, the security server 200 further includes a record updating module 240, which updates user records.

The second exchanging module 120 may send the verification results to the security server. The record updating module 240 may update historical data records related to the user terminal.

Embodiments consistent with the present disclosure store and update historical user data records. For new users, the security server 200 may not have enough historical data records associated with the users. Certain user terminals may also have problematic historical data records because of network problems or user terminal software or hardware issues. For these users, it is important for the security server 200 to update user data records and store the user data in a security database. The security server 200 relies on having accurate historical user data records to analyze user or user terminal behavior. Keeping updated user data records thus improve the security analysis process implemented by the security server.

Figure 14:
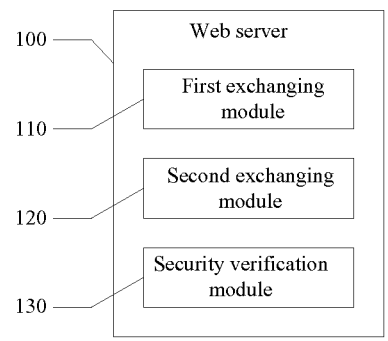
FIG. 14 is another block diagram of an exemplary system for secure network access and services consistent with various embodiments of the present disclosure.

FIG. 14 shows another block diagram of an exemplary web server for providing secure internet access and services. The web server 100 includes a first exchanging module 110 which receives requests from user terminals; a second exchanging module 120, which sends user terminal data to the security server; and a security verification module 130, which receives user terminal security level from the web server, initiates a verification process to authenticate the user terminal.

A user terminal may be a computer, a smartphone, a tablet computer, or any other computing device that can access the internet and internet related services. The request for visit may include data related to the user terminal. The data related to the user terminal may include user account, user terminal identification, etc. The user terminal may send the user terminal data together with a request for internet services to web server 100.

The web server 100 may send the data related to the user terminal to the security server. The web server 100 and the security server are connected through wired or wireless networks. The security server may inquire historical data records related to the user terminal. The security server may search for data records in a security database based on the data related to the user terminal. For example, the security server may identify past service requests, document transfers, or malicious access records related to the user terminal.

The security server may determine the security level of the user terminal. The security server may analyze the user behavior based on the historical data records related to the user terminal, and determine the security level accordingly.

The web server 100 may receive the security level of the user terminal from the security server. The web server 100 may receive the data and results of the security analysis from the security server. The web server may 100 initiate a user verification process based on the user terminal's security level. The web server 100 may initiate a user verification process based on the data and results of the security analysis provided by the security server.

For a user terminal with a high security level, the web server 100 may initiate a simple user verification process, for example, by only requiring user account number and password. For a user terminal with a low security level, the web server 100 may initiate a more secure verification process. For example, in addition to the user account number and password, the web server 100 may check the CATCHA code, SMS verification code, key card password, etc. related to the user account. For a user terminal with the lowest security level, the web server 100 may reject the request to visit the webpage.

The web server 100 may execute the user verification process. As described above, the web server 100 may verify the user terminal based on its security level. The verification process may include the user terminal sending the requested user account number, password, CATCHA code, SMS verification code, key card password, etc. to the web server 100. The web server 100 may receive the data from the user terminal and verify that the user terminal is secure. Once the web server 100 completes the verification process, the web server may provide the user terminal with the requested services. If the user terminal fails the verification process, or that the user terminal has the lowest security level, the web server 100 may reject the request for services from the user terminal (e.g., visit a webpage or access certain contents). The web server 100 thus prevents adversarial users from accessing web pages and/or web contents, reduces waste of network resources, and uses the network resources efficiently.

Embodiments consistent with the present disclosure use a security server and a web server to implement internet security functions. The security server may search for and analyze historical data related to a user terminal. The security server may assign security levels to the user terminal. The web server 100 may implement different verification processes based on the security levels of user terminals. The web server 100 may employ more strict verification processes for less secure user terminals. Embodiments consistent with the present disclosure prevent adversarial users from accessing web pages and/or web contents, reduce waste of network resources, use the network resources efficiently, and improve the security level of various internet services.

For a user terminal with a high security level, the security verification module 130 may initiate a simple user verification process, for example, by only requiring user account number and password. For a user terminal with a low security level, the security verification module 130 may initiate a more secure verification process.

For a user terminal with a low security level, the security verification module 130 may initiate a more secure verification process. For example, in addition to the user account number and password, the web server may check the CATCHA code, SMS verification code, key card password, etc. related to the user account. Other than being an adversarial user terminal, the lower security level of the user terminal may be caused by network issues or user terminal hardware or software issues. Thus, if the user terminal passes the enhanced verification process, then the web server may determine that the user terminal is not adversarial. The web server may then provide the requested services. On the other hand, if the user terminal fails the enhanced verification process, then the web server may determine that the user terminal is adversarial. The web server may then deny the user terminal from accessing the requested services.

Embodiments consistent with the present disclosure use a security server 200 and a web server 100 to implement internet security functions. The security server 200 may search for and analyze historical data related to a user terminal. The security server 200 may assign security levels to the user terminal. The web server 100 may implement different verification processes based on the security levels of user terminals. The web server 100 may employ more strict verification processes for less secure user terminals. Embodiments consistent with the present disclosure prevent adversarial users from accessing web pages and/or web contents, reduce waste of network resources, use the network resources efficiently, and improve the security level of various internet services.

Figure 15:
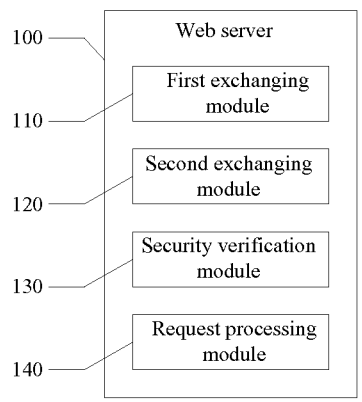
FIG. 15 is another block diagram of an exemplary system for secure network access and services consistent with various embodiments of the present disclosure.

FIG. 15 shows another block diagram of an exemplary system for providing secure internet access and services. FIG. 15 provides detailed descriptions of the system components described in relation to FIG. 14. Specifically, the web server 100 further includes a request processing module 140, which communicate with user terminals regarding service requests.

The first exchanging module 110 may send a request for verification to the user terminal. The first exchanging module 110 may receive verification data submitted by the user terminal. The security verification module 130 may further validate the verification data submitted by the user terminal.

If the user terminal's verification data pass the validation, then the request processing module 140 may provide the requested services to the user terminal. If not, the request processing module 140 may send a message indicating that the user terminal has failed the verification process to the user terminal.

To initiate the verification process, the web server 100 may present a pop-up window for logging-in on the user terminal, display a CATCHA code, send a SMS verification message to a user's mobile phone, or present a pop-up window for entering a security code on the user terminal.

The web server 100 may receive the verification data from the user terminal. The user may enter verification code, password, etc. in response to the verification request from the web server. The web server may receive the verification data from the user terminal.

If the web server 100 determines that the verification data provided by the user terminal are valid, the web server 100 may determine that the user terminal is secure, and provide the requested services to the user terminal. If the web server 100 determines that the verification data provided by the user terminal are invalid, the web server may deny the user terminal's request for services. The web server 100 may further display a message on the user terminal showing the failure of the verification process. The user may re-enter verification data. If the verification data have been found to be invalid multiple times, the web server may deny the user terminal's request for services. The web server may set a time limit after which the user may submit the verification data again.

Embodiments consistent with the present disclosure provide a verification process that corresponds to the security level of the user terminal. For user terminals with a high security level, embodiments of the present disclosure may simplify the verification process and improve the efficiency of the security check process. For user terminals with a low security level, embodiments of the present disclosure enhance the verification process to prevent any malicious attack to the network. Embodiments consistent with the present disclosure improve the security of internet services.

The second exchanging module 120 may send the verification results to the security server. The security server may update historical data records related to the user terminal.

Embodiments consistent with the present disclosure store and update historical user data records. For new users, the security server may not have enough historical data records associated with the users. Certain user terminals may also have problematic historical data records because of network problems or user terminal software or hardware issues. For these users, it is important for the security server to update user data records and store the user data in a security database. The security server relies on having accurate historical user data records to analyze user or user terminal behavior. Keeping updated user data records thus improve the security analysis process implemented by the security server.

Figure 16:
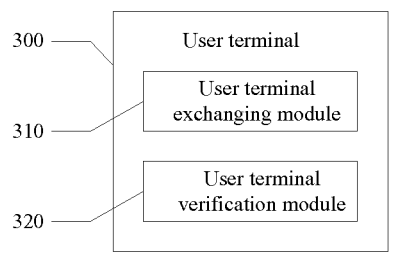
FIG. 16 is another block diagram of an exemplary system for secure network access and services consistent with various embodiments of the present disclosure.

FIG. 16 shows another block diagram of an exemplary user terminal for providing secure internet access and services. The web server 300 includes a user terminal exchanging module 310 and a user terminal verification module 320. The user terminal exchanging module 310 may send requests to a web server and receive the response from the web server. The response from the web server corresponds to the verification process for the user terminal 300, requiring the user terminal 300 to provide verification data. The user terminal verification module 320 may provide the verification data in response to the web server's request.

The user terminal exchanging module 310 may send a request for services to a web server. A user terminal 300 may be a computer, a smartphone, a tablet computer, or any other computing device that can access the internet and internet related services. The request for visit may include data related to the user terminal 300. The data related to the user terminal 300 may include user account, user terminal identification, etc.

The web server may receive a security level of the user terminal. The security level is determined based on user terminal data. The web server may initiate a user verification process based on the user terminal's security level. The web server may initiate a user verification process based on the data and results of the security analysis provided by the security server.

For a user terminal 300 with a high security level, the web server may initiate a simple user verification process, for example, by only requiring user account number and password. For a user terminal 300 with a low security level, the web server may initiate a more secure verification process. For example, in addition to the user account number and password, the web server may check the CATCHA code, SMS verification code, key card password, etc. related to the user account.

For user terminals 300 with a high security level, embodiments of the present disclosure may simplify the verification process and improve the efficiency of the security check process. For user terminals with a low security level, embodiments of the present disclosure enhance the verification process to prevent any malicious attack to the network. Embodiments consistent with the present disclosure improve the security of internet services.

The user terminal verification module 320 may receive the response to its request for services from the web server, requiring the user to complete the verification process. The user terminal verification module 320 may provide verification information requested by the web server.

Once the web server initiates a verification process based on the security level of the user terminal, the web server may inform the user terminal of the verification request. For example, to start the verification process, the user terminal verification module 320 may present a pop-up window for logging-in on the user terminal, display a CATCHA verification code, send a SMS verification message to a user's mobile phone, or present a pop-up window for entering a security code on the user terminal.

The user may enter verification code, password, etc. in response to the verification request from the web server, at the user terminal 300. The web server may receive the verification data from the user terminal 300.

The web server validates the verification data. If the user terminal 300's verification data pass the validation, then the web server provides the requested services to the user terminal 300. If not, the web server sends a message indicating that the user terminal 300 has failed the verification process to the user terminal 300.

If the web server determines that the verification data provided by the user terminal 300 are valid, the web server may determine that the user terminal 300 is secure, and provide the requested services to the user terminal. If the web server determines that the verification data provided by the user terminal 300 are invalid, the web server may deny the user terminal 300's request for services. The web server may further display a message on the user terminal 300 showing the failure of the verification process. The user may re-enter verification data. If the verification data have failed multiple times, the web server may deny the user terminal 300's request for services. The web server may set a time after which the user may submit the verification data again.

Embodiments consistent with the present disclosure provide verification processes that correspond to the security level of the user terminal 300. For user terminals 300 with a high security level, embodiments of the present disclosure may simplify the verification process and improve the efficiency of the security check process. For user terminals 300 with a low security level, embodiments of the present disclosure enhance the verification process to prevent any malicious attack to the network. Embodiments consistent with the present disclosure improve the security of internet services.

In the present disclosure the terms "including," "includes," "include," or the variations thereof do not exclude elements or steps not listed in the present disclosure. The sequence of steps and elements of the described embodiments are for illustrative purposes only, and do not limit the scope of the disclosure.

Consistent with embodiments of the present disclosure, one or more non-transitory storage medium storing a computer program are provided to implement the system and method for secure network accesses and services. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

For example, the web servers and security servers described in relation to FIGS. 11-13 may store data and program instructions in the storage medium described above. Further, a processor may be used to process the data and instructions in the storage medium to implement the methods described in relations to FIGS. 1-4. The web servers and security servers described in relation to FIGS. 14-15 may store data and program instructions in the storage medium described above. Further, a processor may be used to process the data and instructions in the storage medium to implement the methods described in relations to FIGS. 5-8. The user terminal described in relation to FIG. 16 may store data and program instructions in the storage medium described above. Further, a processor may be used to process the data and instructions in the storage medium to implement the methods described in relations to FIGS. 9-10.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems, various systems for providing secure internet access and services can be implemented. For example, in an instant messaging system such as WeChat, a user may use a smartphone to request certain services from a WeChat web server. The WeChat web server may receive the request for services with data related to the smartphone. The WeChat web server may send the data related to the smartphone to a security server. The security server may check the historical user data related to the smartphone and determine a security level for the smartphone. The security server may send the security level to the WeChat web server. The WeChat web server may then initiate a verification process according to the security level of the smartphone.

In another example, in an instant messaging system, such as WeChat, a user group may use a user terminal A to request certain services from a web server. The web server may receive data related to the user terminal A and the list of user accounts in the user group. The web server may receive the request for services with data related to the user terminal A. The web server may send the data related to the user terminal A to a security server. The security server may check the historical user data records related to the user terminal A and determine a security level for the user terminal. The security server may send the security level to the web server. The web server may then initiate a verification process for all users in the user group based on the security level of the user terminal A.

For example, if a second user of the user group logs into the instant messaging application on user terminal B, the web server may initiate pop-up windows requiring the user to enter verification data without checking the security level of user terminal B (based on the security level of the user terminal A) first. Alternatively, when the second user logs in, because of the request for services submitted for the user group, the web server may check the security level of the user terminal B even though the second user has not requested the services. The security server may determine the security level of the user terminal B based on related historical data records. The security server may send the security level to the web server. The web server may initiate a verification process for user terminal B based on the security level of user terminal B.

The web server thus may authenticate the users in one user group based on different security settings. For example, one user group may require that the system check the security level of each of its user's user terminal before initiating the verification process for each user. Another user group may require that the system only check the user terminal from which a "group request" was submitted to request certain services for all users in the group. Another user group may further require that the system check the user terminals used by some of its members but not others. Embodiments consistent with the present disclosure may thus improve the security of internet services.

What is claimed is:

1. A method for providing secure network access and services, comprising:
   receiving, by a web server, a request for services from a user terminal, the request including user terminal data;
   sending, by the web server, the user terminal data to a security server;
   receiving, by the web server, a security level of the user terminal from the security server;
   initiating, by the web server, a verification process based on the security level of the user terminal; and
   when the verification process is successfully completed, responding to, by the web server, the requested services to the user terminal;
   wherein initiating, by the web server, a verification process based on the security level of the user terminal further comprises:
      when the user terminal has a high security level, initiating a simple verification process based on a user identification and a password;
      when the user terminal has a medium security level, initiating an enhanced verification process based on the user identification, the password, and at least one extra verification metric; and
      when the user terminal has a low security level, rejecting the request for services from the user terminal.

2. The method according to claim 1, further comprising:
   receiving verification data from the user terminal; and
   sending a message to the user terminal, the message indicating that the user terminal has failed the verification process.

3. The method according to claim 1, wherein the security server determines the security level of the user terminal based on historical user data related to the user terminal, the historical data including a record on whether the user terminal previously conducted a malicious behavior against the web server.

4. The method according to claim 3, wherein the user terminal has a high security level if the historical user data related to the user terminal does not indicate a security risk.

5. The method according to claim 3, wherein the user terminal has a medium security level if the historical user data related to the user terminal indicates a security risk.

6. The method according to claim 5, further comprising:
initiating the enhanced verification process to check whether the user terminal is used by an adversarial user.

7. A method for providing secure network access and services, comprising:
receiving, by a web server, a request for services from a user terminal, the request including user terminal data;
sending the user terminal data to a security server;
receiving, by the security server, the user terminal data from the web server;
searching for historical user data records related to the user terminal, the historical user data records including a record on whether the user terminal previously conducted a malicious behavior against the web server;
determining a security level of the user terminal based on the historical user data records by comparing a threshold with an occurrence count of the malicious behavior of the user terminal;
sending the security level of the user terminal to the web server; and
initiating, by the web server, a verification process based on the security level.

8. The method according to claim 7, further comprising:
receiving verification data from the user terminal;
validating the verification data; and
when the verification data is successfully validated, providing the requested services to the user terminal.

9. The method according to claim 7, further comprising:
receiving verification data from the user terminal;
sending, by the web server, a result of the verification process to the security server; and
updating the historical user data records of the user terminal according to the result of the verification process.

10. A system for providing secure network access and services, comprising:
a web server configured to receive a request for services from a user terminal, the request including user terminal data; and
a security server configured to receive the user terminal data from the web server; wherein the security server is further configured to:
search for historical user data records related to the user terminal;
determine a security level of the user terminal based on the historical user data records, the historical user data records including a record on whether the user terminal previously conducted a malicious behavior against the web server; and
send the security level of the user terminal to the web server by comparing a threshold with an occurrence count of the malicious behavior of the user terminal; and
wherein the web server is further configured to:
initiate a verification process based on the security level.

11. The system according to claim 10, wherein the web server is further configured to:
receive verification data from the user terminal;
validate the verification data; and
when the verification data is successfully validated, provide the requested services to the user terminal.

12. The system according to claim 10, wherein the security server is further configured to:
update the historical user data records of the user terminal according to a result of the verification process.

13. The system according to claim 10, further comprising:
a user terminal configured to send the request for services to the web server; wherein the user terminal is further configured to receive a response from the web server, the response initiating the verification process.

14. The system according to claim 13, wherein the user terminal is further configured to display a verification window for a user to enter verification data; and to provide the verification data to the web server.

15. The method according to claim 1, wherein:
the security server determines the security level of the user terminal by comparing a threshold with an occurrence count of the malicious behavior of the user terminal.

16. The method according to claim 15, wherein:
when the occurrence count of the malicious behavior is zero, the security server assigns the high security level to the user terminal;
when the occurrence count of the malicious behavior is greater than zero and less than the threshold, the security server assigns the medium security level to the user terminal; and
when the occurrence count of the malicious behavior is greater than the threshold, the security server assigns the low security level to the user terminal.

17. The method according to claim 1, further comprising:
sending, by the web server, a result of the verification process to the security server; and
updating, by the security server, the historical data of the user terminal according to the result of the verification process.

18. The method according to claim 1, wherein:
the malicious behavior includes at least one of an illegal access to a web page or a web content, uploading a virus or a file with virus, and a hacking attempt.

19. The method according to claim 7, wherein initiating, by the web server, a verification process based on the security level of the user terminal further comprises:
when the user terminal has a high security level, initiating a simple verification process based on a user identification and a password;
when the user terminal has a medium security level, initiating an enhanced verification process based on the user identification, the password, and at least one extra verification metric; and
when the user terminal has a low security level, rejecting the request for services from the user terminal.

20. The method according to claim 7, wherein:
when the occurrence count of the malicious behavior is zero, the security server assigns a high security level to the user terminal;
when the occurrence count of the malicious behavior is greater than zero and less than the threshold, the security server assigns a medium security level to the user terminal; and
when the occurrence count of the malicious behavior is greater than the threshold, the security server assigns a low security level to the user terminal.

* * * * *